United States Patent [19]

Zelikman et al.

[11] 3,969,478

[45] July 13, 1976

[54] PROCESS FOR SEPARATION OF TUNGSTEN AND MOLYBDENUM BY EXTRACTION

[76] Inventors: Abram Naumovich Zelikman, ulitsa D. Ulyanova, 4, korpus 2, kv. 251; Grigory Markovich Voldman, Petrozavodskaya ulitsa, 15, korpus 2, kv. 187, both of Moscow; Viktor Konstantinovich Rumyantsev, ulitsa Sportivnaya, 46, kv. 43, Chirchik Tashkentskoi oblasti; Georgy Nikolaevich Ziberov, sovkhoz Lenina otdelenie 3, ulitsa Lermontova, 9, Krasnodarsky krai, Anapa; Valery Sergeevich Kagermanian, ulitsa Krasnogo Mayaka, 8, korpus 2, kv. 469, Moscow, all of U.S.S.R.

[22] Filed: Jan. 30, 1975

[21] Appl. No.: 545,708

[52] U.S. Cl. ............................ 423/54; 75/101 BE
[51] Int. Cl.² ..................... B01D 11/00; B01J 1/04; C01G 37/00; C01G 39/00
[58] Field of Search ......................... 423/54, 658.5; 75/101 BE

[56] References Cited
UNITED STATES PATENTS

| 2,968,527 | 1/1961 | Baker | 423/54 |
| 3,079,226 | 2/1963 | Newkirk | 75/101 BE |
| 3,450,639 | 6/1969 | Maria et al. | 423/54 |
| 3,576,595 | 4/1971 | Chiols et al. | 75/101 BE |

FOREIGN PATENTS OR APPLICATIONS

| 229,693 | 6/1959 | Australia | 75/101 BE |

*Primary Examiner*—Herbert T. Carter
*Attorney, Agent, or Firm*—Haseltine, Lake & Waters

[57] ABSTRACT

A process for the separation of tungsten and molybdenum by extraction involves the addition to an aqueous solution containing tungsten and molybdenum nitric or hydrochloric acid to obtain a pH from 0.5 to 4.3, introduction of a stabilizer comprising water-soluble phosphorus salts and a complexing agent - hydrogen peroxide in an amount from 1.5 to 2 mol per 1 g-atom of the total content of tungsten and molybdenum. Then molybdenum is selectively extracted from the resulting aqueous solution with tri-n-butylphosphate with equal volumetric proportioning of the aqueous and organic solutions. Re-extraction of molybdenum and partially tungsten is carried out from the organic extracting agent with an alkali or soda solution.

The process makes possible the preparation of tungsten solution containing no more than 0.001 g/l of molybdenum, and an increase in the degree of extraction of tungsten and molybdenum.

10 Claims, No Drawings

PROCESS FOR SEPARATION OF TUNGSTEN AND MOLYBDENUM BY EXTRACTION

The present invention relates to the hydrometallurgy of rare metals, and more particularly to a process for the separation of tungsten and molybdenum by extraction from aqueous solutions of chemical compounds thereof.

The separation of tungsten and molybdenum in aqueous solutions of salts thereof is one of the most complicated problems in the production of pure chemical compounds of tungsten, such as ammonium paratungstate and tungstic acid, and hence, metallic tungsten.

At present only one commercial process for the separation of tungsten and molybdenum from aqueous solutions obtained after the alkali decomposition of molybdenum-containing tungsten concentrate is known. This process, which is referred to as trisulfide purification involves a precipitation of hardly soluble molybdenum trisulfide from solutions containing sodium tungstate and molybdate.

In this process, tungsten mainly remains in the aqueous solution.

However, the process of trisulfide purification cannot provide for a desired separation of tungsten and molybdenum with a high content of molybdenum in the tungsten concentrate, such as with 4 – 5 w.% of molybdenum contained in scheelite concentrate. About 0.1 w.% of molybdenum remains in tungstic acid, whereas tungsten used for electronic and vacuum electronic techniques should contain less than 0.02 w.% of molybdenum as impurity.

In addition, a considerable quantity of tungsten up to 1 – 1.5 w.% of the starting content thereof in the aqueous solution is lost with the molybdenum sulfide precipitate.

The disadvantages of this process also include contamination of the environment with noxious sulfhydrates formed in the production liquors during the trisulfide purification of tungsten from molybdenum.

During the decomposition of scheelite concentrates with hydrochloric acid a separation of tungsten and molybdenum also occurs. In this case, tungsten substantially completely precipitates in the form of tungstic acid, and the main part of the molybdenum remains in the aqueous solution. It should be, however, noted that tungstic acid obtained after decomposition of such concentrates with hydrochloric acid contains generally from 0.1 to 0.3 w.% of molybdenum, which is undesirable.

It is known to separate tungsten and molybdenum by extracting molybdenum with an organic extracting agent — methyl isobutyl ketone or acetophenone from a sludge of tungstic acid containing also hydrochloric acid. This method permits reducing the content of molybdenum in tungstic acid up to 0.02 w.%.

The process conducted by this method requires, however, a high consumption of hydrochloric acid of up to 8 tons per 1 ton of tungsten concentrate so that such a method cannot have any industrial application.

Rapid and widespread development of such important industries as electronic engineering, and electrovacuum technology, production of pure compounds and the like impose stringent requirements on the purity of metallic tungsten and molybdenum and their compounds.

The necessity for complex, economic and rational utilization of deposits of difficultly available tungsten and molybdenum concentrates and products makes very urgent the solution of the problem of the provision of a new efficient process for separation of these metals.

The main difficulty lies in that molybdenum is a permanent and difficultly separated impurity in tungsten ores and production liquors containing tungsten.

Difficulties in separating tungsten and molybdenum are associated with the affinity of these metals. This circumstance explains the fact that none of the above-described processes of separating tungsten and molybdenum can provide for complete separation of the metals.

The attempts to separate tungsten and molybdenum by extraction with organic extracting agents from aqueous solutions of salts thereof have not gained expected results due to the affinity of tungsten and molybdenum.

The difficulties become still more serious due to the fact that at a pH less than 2 tungstic acid precipitates from aqueous solutions containing tungsten, and molybdenic acid is precipitated therewith, while at a pH from 2 to 7 tungsten and molybdenum form polyanions, for example, of the type $[H(W,Mo)_6O_{21}\cdot ag]^{5-}$ and of another composition.

It is obvious, that over a large range of pH of an aqueous solution tungsten and molybdenum either precipitate or are strongly bound into polymeric complexes. Both circumstances show the impossibility of selecting the conditions for complete separation of tungsten and molybdenum by extraction from conventional aqueous solutions.

On the basis of theoretical and experimental tests, it has been found that the process for the separation of tungsten and molybdenum by extraction should be carried out under qualitatively new conditions, wherein these metals could be retained in the solution over a wide range of pH without formation of common complexes between them which have different chemical properties and extraction ability.

The theoretical and experimental tests haave shown that both conditions are provided by adding to a solution containing tungsten and molybdenum a complexing agent - hydrogen peroxide and preferably also water-soluble phosphorus compounds.

It has been found, that peroxide complexes of tungsten and molybdenum formed after adding hydrogen peroxide to the solution exhibit different chemical and extraction properties.

Tungstic acid will never precipitate at any pH of an aqueous solution in the presence of hydrogen peroxide.

In addition, the degree of polymerization of tungsten and molybdenum in an aqueous solution and their capability of forming combined polymeric complexes are reduced.

Separation of tungsten and molybdenum by extraction from such solutions is possible using neutral and ion-exchange organic extracting agents.

It is the main object of the invention to provide a process for the separation of tungsten and molybdenum by extraction which permits obtaining a solution of chemical compounds of tungsten containing substantially no molybdenum from an aqueous solution of chemical compounds thereof.

An important object of the invention is to increase the degree of extraction of tungsten from 5 to 10 w.% into the high-quality end product — tungsten trioxide containing less than 0.005 w.% of molybdenum.

Still another object of the invention is to increase the degree of extraction of molybdenum from 2 to 3 w.% as compared to that obtained with trisulfide purification.

It is also an object of the invention to simplify the process for the separation of tungsten and molybdenum and provide the conditions for automation of the process.

A not least important object of the invention is to eliminate contamination of the environment with noxious production wastes occurring with the trisulfide purification of tungsten from molybdenum.

These objects are accomplished by the provision of a process for the separation of tungsten and molybdenum by extraction with organic extracting agents from an aqueous solution of chemical compounds thereof, wherein, according to the invention to said solution there is added a complexing agent — hydrogen peroxide in an amount from 1.5 to 2 mol per 1 g-atom of the total content of tungsten and molybdenum and then an inorganic acid selected from the group consisting of nitric, hydrochloric and sulfuric acids to obtain a pH of the solution from 0.5 to 1.8, whereafter molybdenum is extracted from the resulting solution with neutral or ion-exchange extracting agents with the volumetric ratio of the aqueous solution to the organic solution of 1:1 to 1.5.

The process for the separation by extraction according to the invention provides for obtaining a solution containing chemical compounds of tungsten with a molybdenum impurity from 0.001 to 0.003 w.%.

Besides, it has been found that it is necessary to strictly maintain the above-described operating conditions in conducting the separation of tungsten and molybdenum by extraction. A decrease in the consumption of hydrogen peroxide below 1.5 mol per 1 g-atom of the total content of tungsten and molybdenum results in a rapid destruction of the peroxide complex of tungsten and, hence, in a more rapid precipitation of tungstic acid and hampered extraction conditions. An increase in the consumption of hydrogen peroxide above 2 mol per 1 g-atom of the total content of tungsten and molybdenum is technologically unreasonable and may only result in a needless consumption of hydrogen peroxide.

The above-specified range of pH provides for the most complete separation of tungsten and molybdenum since maximum extraction of molybdenum and minimum extraction of tungsten are obtained within this range.

It has been found that the above-specified ratio between the volumes of organic and aqueous solutions ($V_{org.} : V_{aq.}$ = from 1 to 1.5) is the optimal one since with a lower ratio the coefficient of molybdenum distribution $E_{mo}$ is reduced resulting in an increased number of extraction stages and volume of extraction equipment, and with an increase in this ratio the consumption of organic extracting agent becomes greater and the concentration of molybdenum in the organic extracting agent is lower.

The above-described complexing agent may be used with water-soluble phosphorus compounds taken in an amount from 0.002 to 0.005 mol/l.

This permits carrying out the separation of tungsten and molybdenum by extraction from production liquors containing silicon, arsenic and phosphorus impurities.

It has also been found that a decrease or increase in the amount of water-soluble phosphorus compounds added to the production liquor as compared to the range from 0.002 to 0.005 mol/l results in an increased rate of destruction of hydrogen peroxide and reduced efficiency of separation of tungsten and molybdenum by extraction.

The separation of tungsten and molybdenum by extraction is preferably conducted using neutral extracting agents, such as tri-n-butyl phosphate or tributyl phosphine oxide from aqueous solutions in the presence of nitric acid at a pH from 0.5 to 1.0.

This permits a maximum efficiency of purification of tungsten from molybdenum with a minimum number of production stages.

The separation of tungsten and molybdenum by extraction from aqueous solutions using an ion-exchange extracting agent, such as trioctylamine is preferably conducted in the presence of nitric acid within the pH range from 0.5 to 1.8 since in this pH range an optimal separation of the metals is achieved.

The separation of tungsten and molybdenum by extraction from aqueous solutions using tri-n-butyl phosphate is preferably effected in the presence of hydrochloric acid within the pH range from 1.5 to 1.8 to obtain an efficient separation and sufficient stability of hydrogen peroxide.

The separation of tungsten and molybdenum by extraction from aqueous solutions using tri-n-butyl phosphate may be conducted in the presence of sulfuric acid within the pH range from 0.5 to 1.5 since it is in this range that a satisfactory separation of the metals takes place.

The invention will now be illustrated by examples of specific embodiments of the process according to the invention.

EXAMPLE 1

From an artificially prepared aqueous solution containing 19 g/l of tungsten and 1 g/l of molybdenum and acidified with nitric acid to pH = 0.5 with a preliminary addition of hydrogen peroxide used in an amount of 1.5 mol per 1 g-atom of the total content of the metals 79 w.% of molybdenum were extracted at one stage with tri-n-butyl phosphate with the volumetric ratio of the aqueous to organic solution of 1:1. Substantially no tungsten was extracted.

After three sequential extraction stages with fresh tri-n-butyl phosphate with the volumetric ratio of the aqueous to organic solution of 1:1 the content of molybdenum in the aqueous solution was reduced to 0.01 g/l, the content of tungsten being as high as 18.5 g/l.

In this example the separation by extraction may be effected using an organic extracting agent comprising tributyl-phosphine oxide with the same efficiency.

EXAMPLE 2

The separation of tungsten and molybdenum by extraction may be effected with an ion-exchange extracting agent such as a salt of quaternary ammonium base from an aqueous solution in the presence of nitric acid at pH from 2.5 to 2.8 or in the presence of sulphuric acid at pH = 4.3.

0.003 mol/l of sodium pyrophosphate were added to an artificially prepared aqueous solution of sodium tungstate and sodium molybdate containing 78.65 g/l of tungsten trioxide, 4.7 g/l of molybdenum and 0.1 g/l of silicon. Then hydrogen peroxide was added to the solution in an amount of 2 mol per 1 g-atom of the total content of tungsten and molybdenum and nitric acid to obtain a pH of 0.9. Subsequently the extraction was conducted using tri-n-butyl phosphate with the volumetric ratio of the aqueous to organic solution of 1:1.

The test results have shown that the coefficient of tungsten distribution $D_w$ was below 0.0045, whereas the coefficient of distribution for molybdenum $D_{Mo}$ was equal to 4. 78.3 g/l of tungsten trioxide and only 0.9 g/l of molybdenum were found in the tungsten solution after the extraction.

EXAMPLE 3

0.005 mol/l of sodium pyrophosphate were added to a production liquor obtained after decomposition of scheelite concentrate with soda containing 109.8 g/l of tungsten trioxide, 9.103 g/l of molybdenum, 0.15 g/l of silicon dioxide, 0.0045 g/l of phosphorus, 0.003 g/l of arsenic, 25 g/l of sodium nitrate and 3.5 g/l of sodium hydroxide. Then nitric acid was added to the resulting solution to obtain a pH of 0.5, and hydrogen peroxide in an amount of 2 mol per 1 g-atom of the total content of tungsten and molybdenum.

The extraction was conducted with tri-n-butyl phosphate in a mixing and settling apparatus continuously in countercurrent with the ratio of flows of aqueous and organic solutions of 1:1.5.

Throughput capacity of the apparatus was 6 l/hour of the total flow of the organic and aqueous solutions, with the volume of one section of the apparatus being equal to 2.5 l.

After eight extraction stages in an equilibrium aqueous solution the content of tungsten trioxide was 102.8 g/l and the content of molybdenum was lowered to 0.0033 g/l. The content of tungsten in the organic solution was 7.0 g/l and the content of molybdenum — 9.1 g/l.

The tests of re-extraction of molybdenum and tungsten have shown that both metals are extracted from tri-n-butyl-phosphate in an aqueous solution containing 10 w.% of water and about 8 w.% of sodium nitrate with four stages with continuous counter-current operation and with the volumetric ratio of aqueous to organic solutions of 1:1.

The resulting re-extracts contained from 14 to 16 g/l of tungsten trioxide and from 18 to 20 g/l of molybdenum. 0.2 g/l of tungsten trioxide and 0.002 g/l of molybdenum remained in the organic solution.

EXAMPLE 4

From a production liquor obtained after decomposition of scheelite concentrate with soda containing 120 g/l of tungsten trioxide, 5.8 g/l of molybdenum, 0.15 g/l of g/l dioxide, 0.005 g/l phosphorus and 0.003 g/l of arsenic, after adding thereto 0.005 mol/l of sodium pyrophosphate, and 1.8 mol of hydrogen peroxide per 1 g-atom of the total content of tungsten and molybdenum and hydrochloric acid to obtain a pH of the solution of about 1.5, molybdenum was extracted with tri-n-butyl phosphate continuously in counter-current in a mixing and settling apparatus as described in Example 3.

With six extraction stages with the volumetric ratio of aqueous to organic solutions of 1:1.3 substantially the total content of molybdenum was extracted from the solution. The content of molybdenum in the aqueous solution was lowered to 0.003 g/l, and the content of tungsten trioxide in the aqueous solution was 113.2 g/l.

6.8 g/l of tungsten trioxide and 5.78 g/l of molybdenum remained in the organic solution.

The re-extraction was conducted as described above.

EXAMPLE 5

Hydrogen peroxide was added to an artificially prepared solution containing 98.5 g/l of tungsten and 9.6 g/l of molybdenum in an amount of 2 mol per 1 g-atom of the total content of tungsten and molybdenum, and hydrochloric acid was then added to obtain a pH of about 1.8. Molybdenum was extracted from the resulting solution with tri-n-butyl phosphate with the volumetric ratio of the aqueous to organic solutions of 1:1. 86 w.% of molybdenum and only 2 w.% of tungsten were extracted in a single stage.

With four sequential re-extraction stages with a fresh extracting agent the content of molybdenum in the aqueous solution of tungsten was lowered to 0.0016 g/l.

EXAMPLE 6

Hydrogen peroxide in an amount of 1.5 mol per 1 g-atom of the total content of tungsten and molybdenum was added to an artificially prepared solution containing 19 g/l of tungsten and 1 g/l of molybdenum, and then sulfuric acid was added to obtain a pH = 0.65. Molybdenum, and partially tungsten were selectively extracted from the resulting solution using tri-n-butyl phosphate. Coefficient of molybdenum distribution was $D_{Mo} = 3$, coefficient of tungsten distribution was $D_W = 0.18$. 80 w.% of molybdenum and 15 w.% of tungsten were transferred into the organic solution at a single extraction stage.

Molybdenum content in the aqueous solution was lowered to 0.2 g/l, and the content of tungsten was as high as 16.5 g/l.

EXAMPLE 7

Nitric acid was added to an artificially prepared solution containing 20 g/l of tungsten and 1 g/l of molybdenum to obtain a pH = 1.8, and then hydrogen peroxide was added to the solution in an amount of 1.5 mol per 1 g-atom of the total content of tungsten and molybdenum.

Subsequently the extraction was effected with a 15% solution of trioctylamine in kerosene with the volumetric ratio of the aqueous to organic solution of 1:1. Up to 80 w.% of molybdenum and about 3 w.% of tungsten were extracted in a single stage.

We have also conducted physical and chemical studies on the chemical states of molybdenum and tungsten in the presence of hydrogen peroxide and on the mechanism governing the extraction of molybdenum from peroxide solutions.

We have found that, independently of the kind of inorganic acid used, diperoxidemolybdenic acid and diperoxidetungstic acid of the general formula $H_2Me_2O_{11}(H_2O)_2$ are formed in weakly acidic solutions.

It has been shown that the extraction of molybdenum proceeds in conformity with the hydronium mechanism. Molybdenum is converted into the organic phase in the body of hydrosolvate of the formula $[H_3O(H_2O)_3 \cdot 3\ TBP]_2 \cdot [Mo_2O_{11}(H_2O)_2]^{2-}$ 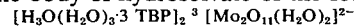

EXAMPLE 8

From an artificially prepared aqueous solution containing 19.6 g/l of tungsten and 0.9 g/l of molybdenum acidified with sulfuric acid to obtain a pH = 4.3, to which there was preliminarily added hydrogen peroxide in the amount of 1.5 mole per 1 g-atom of the total content of metals, more than 90 w.% of molybdenum and 15 w.% of tungsten were extracted in a single stage with a 0.1 molar solution of quaternary ammonium tetraoctylammonium sulfate compound in toluene. The coefficient of separation of the metals was $\beta = 73$. The ratio of the volumes of aqueous and organic solutions was 1:1.

In this example, the separation of the abovementioned metals may be equally well carried out from their aqueous solutions of nitric acid with a pH from 2.5 to 2.8.

What is claimed is:

1. A process for the separation of tungsten and molybdenum by extraction comprising the steps of: adding to an aqueous solution containing chemical compounds of tungsten and molybdenum a complexing agent which is hydrogen peroxide in an amount of from 1.5 to 2 mol per 1 g-atom of the total content of tungsten and molybdenum; adding to the resulting solution an acid selected from the group consisting of nitric, hydrochloric and sulfuric acids to obtain a pH of the solution from 0.5 to 1.8; and selectively extracting molybdenum from the resulting solution with an organic extracting agent selected from the group consisting of tri-n-butyl phosphate, tributyl phosphine oxide and trioctylamine with the volumetric ratio of the aqueous organic solutions of from 1:1 to 1.5.

2. The process of claim 1, wherein said complexing agent is added along with water-soluble phosphorus compounds used in an amount from 0.002 to 0.005 mol/l.

3. The process of claim 1, wherein the separation of tungsten and molybdenum by extraction is effected with tri-n-butyl phosphate or tributyl phosphine oxide from aqueous solution in the presence of nitric acid at a pH from 0.5 to 1.0.

4. The process of claim 3 wherein the extracting agent is tri-n-butyl phosphate.

5. The process of claim 3 wherein the extracting agent is tributyl phosphine oxide.

6. The process of claim 1, wherein the separation of tungsten and molybdenum by extraction is effected with trioctylamine, from aqueous solution in the presence of nitric acid at a pH from 0.5 to 1.8.

7. The process of claim 1, wherein the separation of tungsten and molybdenum by extraction is effected with tri-n-butylphosphate from aqueous solutions in the presence of hydrochloric acid at a pH from 1.5 to 1.8.

8. The process of claim 1, wherein the separation of tungsten and molybdenum by extraction is effected with tri-n-butyl phosphate from aqueous solutions in the presence of sulfuric acid at pH from 0.5 to 1.5.

9. A process for the separation of tungsten and molybdenum by extraction comprising the steps of: adding to an aqueous solution containing chemical compounds of tungsten and molybdenum a complexing agent which is hydrogen peroxide in an amount of from 1.5 to 2 mol per 1 g-atom of the total content of tungsten and molybdenum; adding to the resulting solution nitric acid to obtain a pH of from 2.5 to 2.8 or sulfuric acid to obtain a pH of 4.3; and selectively extracting molybdenum from the resulting solution with a salt of a quaternary ammonium base with the volumetric ratio of the aqueous to organic solutions of from 1:1 to 1.5.

10. The process of claim 9 wherein the salt of a quaternary ammonium base is tetraoctyl ammonium sulfate.

* * * * *